UNITED STATES PATENT OFFICE.

GEORGE L. EAGAN, OF SAN FRANCISCO, CALIFORNIA.

IMPROVEMENT IN COMPOSITIONS FOR PAVEMENTS.

Specification forming part of Letters Patent No. 139,127, dated May 20, 1873; application filed April 6, 1871.

*To all whom it may concern:*

Be it known that I, GEORGE L. EAGAN, of San Francisco, in the county of San Francisco and State of California, have invented a new and useful Concrete Composition for Street-Pavements and other purposes; and I do declare that the following is a full and exact description of the same.

The invention consists in the employment of petroleum, bituminous matter, clay, or earthy matter, and hydraulic cement, prepared in the manner and combined in the proportions herein specified, for the purposes above referred to.

The method of preparation is as follows: Take four parts of pitch, asphaltum, or other equivalent bituminous material; six parts clay or earthy matter; one part hydraulic cement; ten parts gravel; and petroleum in about the proportion of ten gallons to a ton of pitch. If preferred, sulphuric acid may be added in about the proportion of one pound to a ton of the pitch. These elements are to be prepared and combined in the following manner: First, heat the pitch and the petroleum together, in suitable vessels, to the boiling-point; then add the hydraulic cement; then by degrees the clay. After the mixture has been well stirred, add the gravel, and if sulphuric acid is to be used, add that also. The quantity of sulphuric acid may vary according to the degree of hardness desirable to be attained. As soon as the composition has been well mixed, it is ready to be molded into any shape desired.

I am aware that bituminous materials, clay, hydraulic cement, and gravel, have long been used in the preparation and manufacture of concrete compositions for pavements, and I do not broadly claim their combination. I am also aware that oils have been used in connection with pitch and other bituminous materials for similar purposes, and I do not claim their combination; but I am not aware of any similar use of petroleum in combination with bituminous material in preparing it for mixture with clay, cement, and gravel. Such combination is superior to any other with which I am familiar for the purpose referred to; and

I claim as my invention—

1. The process of preparing concrete by first boiling petroleum and pitch together, and then adding cement, clay, and gravel, in the proportions described, as herein set forth.

2. The concrete produced by the process herein described.

GEORGE L. EAGAN. [L. S.]

In presence of—
 H. M. THOMPSON,
 I. N. HAYDEN.